Oct. 15, 1935.　　　G. DOUGHERTY　　　2,017,042
PIPE PAINTING MACHINE
Filed Feb. 27, 1932　　　3 Sheets-Sheet 3

Inventor:
GEORGE DOUGHERTY,
by:
his Attorneys.

Patented Oct. 15, 1935

2,017,042

UNITED STATES PATENT OFFICE 2,017,042

PIPE PAINTING MACHINE

George Dougherty, Port Vue, Pa., assignor to National Tube Company, a corporation of New Jersey Application February 27, 1932, Serial No. 595,603

3 Claims. (Cl. 91—25)

This invention is a machine which I have contrived for the purpose of thoroughly coating the inside of a pipe while being moved through it.

In its primary form it consists of a structure which may be passed through a pipe, and carries nozzles arranged to create a radially directed spray of paint and revolvable brushes which work this spray-applied paint into a homogeneous coating. Preferably, its construction is such that it accommodates a reasonable range of pipe sizes, and the nozzles revolve as well as the brushes. A suitable motor may be arranged to operate these moving parts, or they may be worked by hand.

I will now disclose a specific example of a machine which includes the just described and other features, and being what I at present consider a preferable form of my invention.

Having reference to the accompanying drawings.

Figure 1:
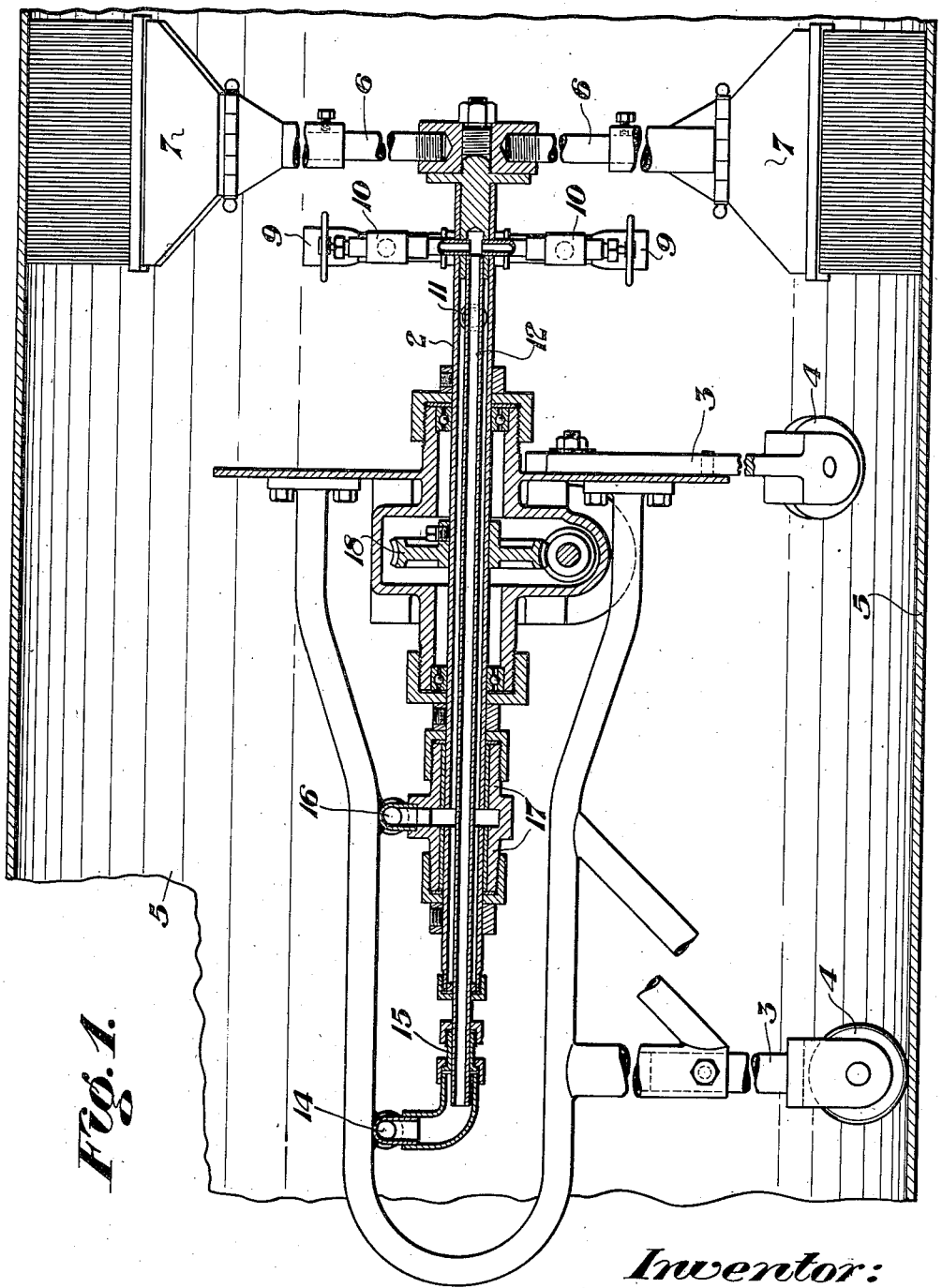
Figure 1 is a longitudinal vertical cross-section of this machine.
Figure 2:
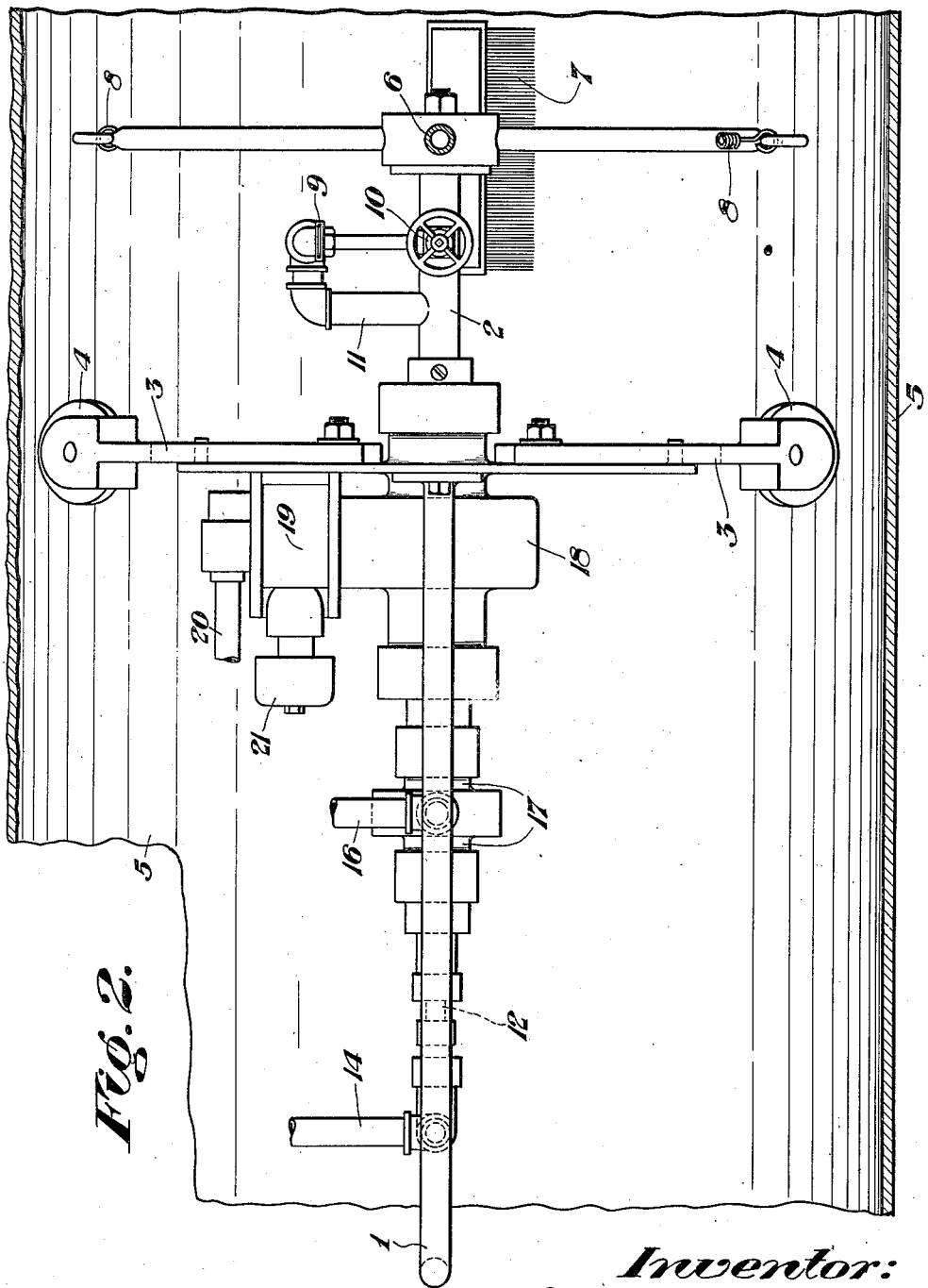
Figure 2 is a top plan.
Figure 3:
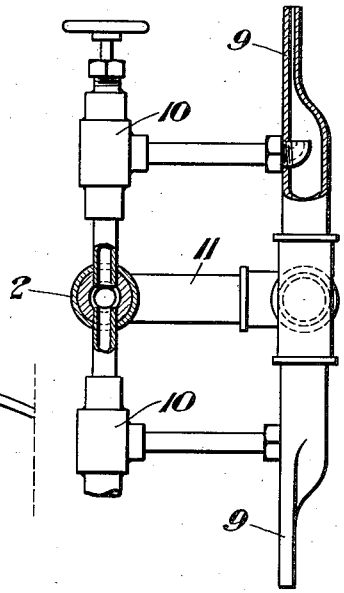
Figure 3 shows the nozzles in detail.
Figure 4:
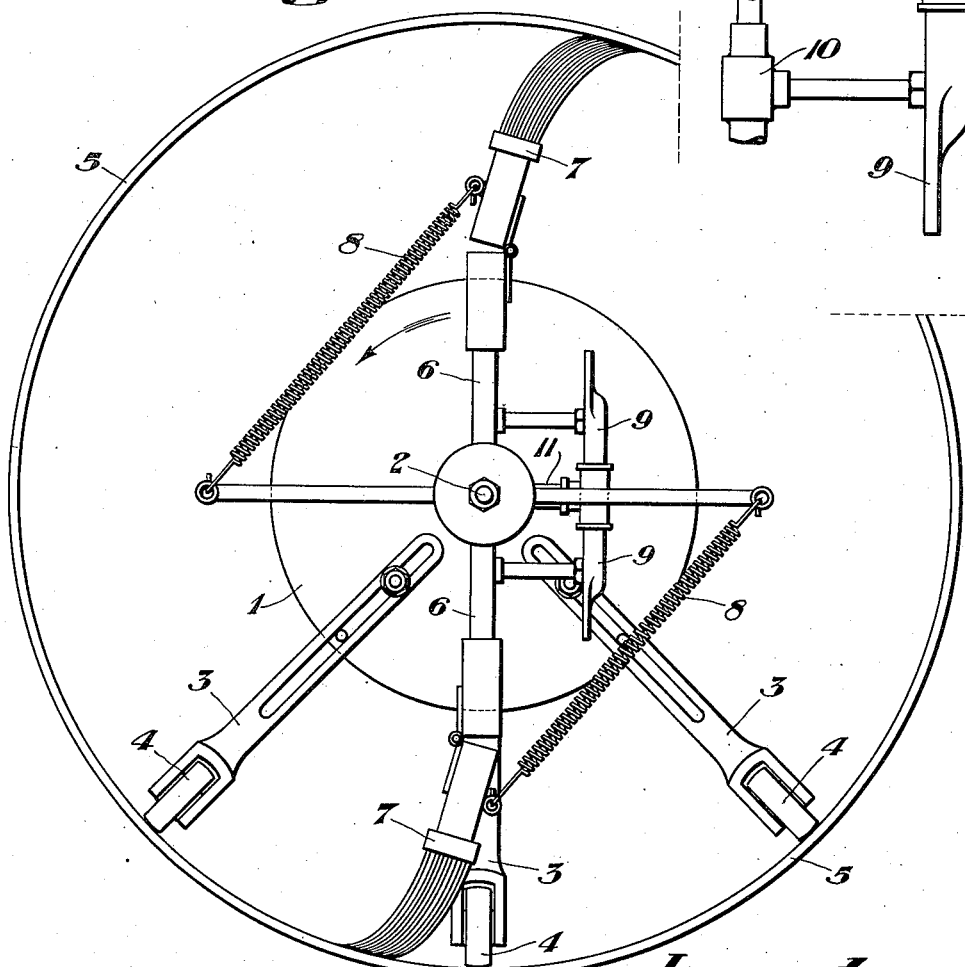
Figure 4 is an end elevation of the brush end of the machine.

In detail, a frame 1 carries an axle 2 and has radially extending adjustable legs 3 provided with rollers 4. These legs are adjusted so that their rollers 4 bear against the inside of a pipe 5, the one to be coated, and hold the axle 2 at the axis of this pipe.

The end of the axle carries radially extending arms 6 having hinged brushes 7 on their ends, resiliently urged into alinement with the arms by springs 8. These brushes are hinged to swing in a direction opposite that in which the arms are rotated. The brushes 7 swing against the force of the springs 8 more or less, depending on the size of the pipe 5.

Radially directed nozzles 9 are carried by the axle 2 on valved headers 10 and a single direct header 11. This axle is in the form of a tube which, in turn, carries a second tube 12 which communicates with the headers 10 and has a paint inlet 14. The latter connection is made through a stuffing box 15, to permit rotation of the axle. The space between the inside of the axle 2 and the outside of the tube 12 communicates with the header 11 and a compressed air inlet 16. This connection is made through a double-ended stuffing box 17, also for the purpose of permitting rotation of the axle 2.

The frame 1 carries a gear reduction unit 18 which gears an air motor 19 to the axle 2. Compressed air is supplied to this motor through an inlet 20, and exhausts through a muffler 21.

In use, the machine is inserted in a pipe and is manually drawn through by the frame 1, paint being supplied through the inlet 14 and air through the inlet 16. The valves in the headers 10 are adjusted so that the paint comes from the nozzles in a spray. Air is supplied to the motor 19 so that the nozzles and brushes revolve as the machine moves through the pipe. The fact that these nozzles are slightly offset from the axis of the pipe by their carrying headers does not prevent the production of a radial spray, because the diameter of the pipe 5 is sufficiently large to render this slight displacement negligible.

Although I have shown a specific form of my invention in accordance with the patent statutes, I do not intend to limit its scope exactly thereto, except as defined by the following claims.

I claim:

1. A machine for coating the insides of pipes comprising a frame carrying an axle and having radially extending legs proportionately adjustable to hold this axle substantially at the axis of a pipe, said axle carrying radially extending arms having hinged brushes resiliently urged into alinement with these arms and also carrying radially directed nozzles and being constructed with internal ducts for leading compressed air and coating fluid to the latter, and a motor carried by said frame and geared to said axle.

2. In a machine for coating the insides of pipes, a frame carrying means for applying coating material to the insides of pipes and revolvable members carried by the frame and for working said material, said frame having legs that are adjustable to accommodate a range of pipe sizes and which are arranged to hold said frame so that the axis of revolution of said members is substantially at the axis of the pipe being coated, mountings for said revolvable members permitting their movement through sufficient distances to enable them to contact the insides of pipes of sizes within said range and means for urging the revolvable members outwardly during operation of the machine.

3. A machine for coating the insides of pipes comprising a frame carrying an axle and having radially extending legs proportionately adjustable to hold this axle substantially at the axis of a pipe, said axle carrying radially extending arms having hinged brushes resiliently urged into alinement with these arms and also carrying radially directed nozzles and being constructed with internal ducts for leading compressed air and coating fluid to the latter.

GEORGE DOUGHERTY.